United States Patent
Van ham et al.

(10) Patent No.: US 9,058,316 B2
(45) Date of Patent: Jun. 16, 2015

(54) SYSTEM AND METHOD FOR ANNOTATION OF DATA VISUALIZATIONS

(75) Inventors: Franciscus Jacobus Van ham, Cambridge, MA (US); Martin Miles Wattenberg, Wellesley, MA (US); Fernanda Bertini Viégas, Boston, MA (US); Jesse Holton Kriss, Cambridge, MA (US); Matthew Mehall McKeon, Cambridge, MA (US); Jeffrey Heer, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 1970 days.

(21) Appl. No.: 11/844,787

(22) Filed: Aug. 24, 2007

(65) Prior Publication Data
US 2009/0055724 A1  Feb. 26, 2009

(51) Int. Cl.
*G06F 17/00* (2006.01)
*G06F 17/24* (2006.01)
*G06F 17/21* (2006.01)

(52) U.S. Cl.
CPC ............ *G06F 17/241* (2013.01); *G06F 17/211* (2013.01)

(58) Field of Classification Search
CPC .............................. G06F 17/241; G06F 17/211

USPC .......................................................... 715/232
See application file for complete search history.

(56) References Cited

U.S. PATENT DOCUMENTS

| | | | | |
|---|---|---|---|---|
| 6,262,728 B1 * | 7/2001 | Alexander | ................. | 345/440.1 |
| 6,307,573 B1 * | 10/2001 | Barros | ......................... | 715/764 |
| 7,512,875 B2 * | 3/2009 | Davis | ............................ | 715/215 |
| 7,667,582 B1 * | 2/2010 | Waldorf | ........................ | 340/440 |
| 7,961,188 B2 * | 6/2011 | Tolle et al. | ..................... | 345/440 |
| 8,219,543 B2 * | 7/2012 | Vanderport et al. | ......... | 707/711 |
| 2005/0232055 A1 * | 10/2005 | Couckuyt et al. | ............ | 365/227 |

OTHER PUBLICATIONS

Brath, et al., "Excel Visualizer: One Click WYSIWYG Spreadsheet Visualization", Proceedings of the Information Visualization (IV '06), copyright 2006 IEEE, p. 1-6.*

* cited by examiner

*Primary Examiner* — Amelia Tapp
(74) *Attorney, Agent, or Firm* — Holland & Knight LLP; Brian J. Colandreo, Esq.; Jeffrey T. Placker, Esq.

(57) ABSTRACT

A method and computer program product for generating a data visualization based, at least in part, upon a data set. A first user is allowed to add an annotation to at least a portion of the data visualization. A determination is made concerning whether the annotation is associatable with any portion of the data set.

18 Claims, 5 Drawing Sheets

SYSTEM AND METHOD FOR ANNOTATION OF DATA VISUALIZATIONS

TECHNICAL FIELD

This disclosure relates to data visualizations and, more particularly, to the inclusion of graphical annotations within a data visualization.

BACKGROUND

When sharing data visualizations (i.e., interactive visual representations of data) online, a user may wish to annotate these data visualizations to communicate with other users more effectively. Text-based annotation of documents is well established and considerable research has been performed concerning the annotation of online web pages in general. However, these systems typically only offer text-based annotations of a webpage; thus not offering a way to include user drawn graphics within the annotations.

Since data visualizations are often inherently graphical, text-based annotations may be cumbersome and may only allow for a limited range of expression. While a limited number of systems allow for free form annotations on media, these systems may not allow for the reuse of annotations within different contexts.

SUMMARY OF DISCLOSURE

In a first implementation, a method includes generating a data visualization based, at least in part, upon a data set. A first user is allowed to add an annotation to at least a portion of the data visualization. A determination is made concerning whether the annotation is associatable with any portion of the data set.

One or more of the following features may be included. If the annotation is associatable with any portion of the data set, the annotation may be linked with a specific portion of the data set. If the annotation is associatable with any portion of the data set, a current state of one or more physical characteristics of the data visualization may be associated with the annotation. Linking the annotation with a specific portion of the data set may include defining an annotation table that identifies a linkage between the annotation and the specific portion of the data set.

If the annotation is not associatable with any portion of the data set, the annotation may be linked with the data visualization. Linking the annotation with the data visualization may include defining the annotation and defining the position of the annotation within the data visualization.

The data set may be a tabular data set. The data visualization may be a graphical representation of the data set. A second user may be allowed to add an annotation to at least a portion of the data visualization.

In another implementation, a computer program product resides on a computer readable medium that has a plurality of instructions stored on it. When executed by a processor, the instructions cause the processor to perform operations including generating a data visualization based, at least in part, upon a data set. A first user is allowed to add an annotation to at least a portion of the data visualization. A determination is made concerning whether the annotation is associatable with any portion of the data set.

One or more of the following features may be included. If the annotation is associatable with any portion of the data set, the annotation may be linked with a specific portion of the data set. If the annotation is associatable with any portion of the data set, a current state of one or more physical characteristics of the data visualization may be associated with the annotation. Linking the annotation with a specific portion of the data set may include defining an annotation table that identifies a linkage between the annotation and the specific portion of the data set.

If the annotation is not associatable with any portion of the data set, the annotation may be linked with the data visualization. Linking the annotation with the data visualization may include defining the annotation and defining the position of the annotation within the data visualization.

The data set may be a tabular data set. The data visualization may be a graphical representation of the data set. A second user may be allowed to add an annotation to at least a portion of the data visualization.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
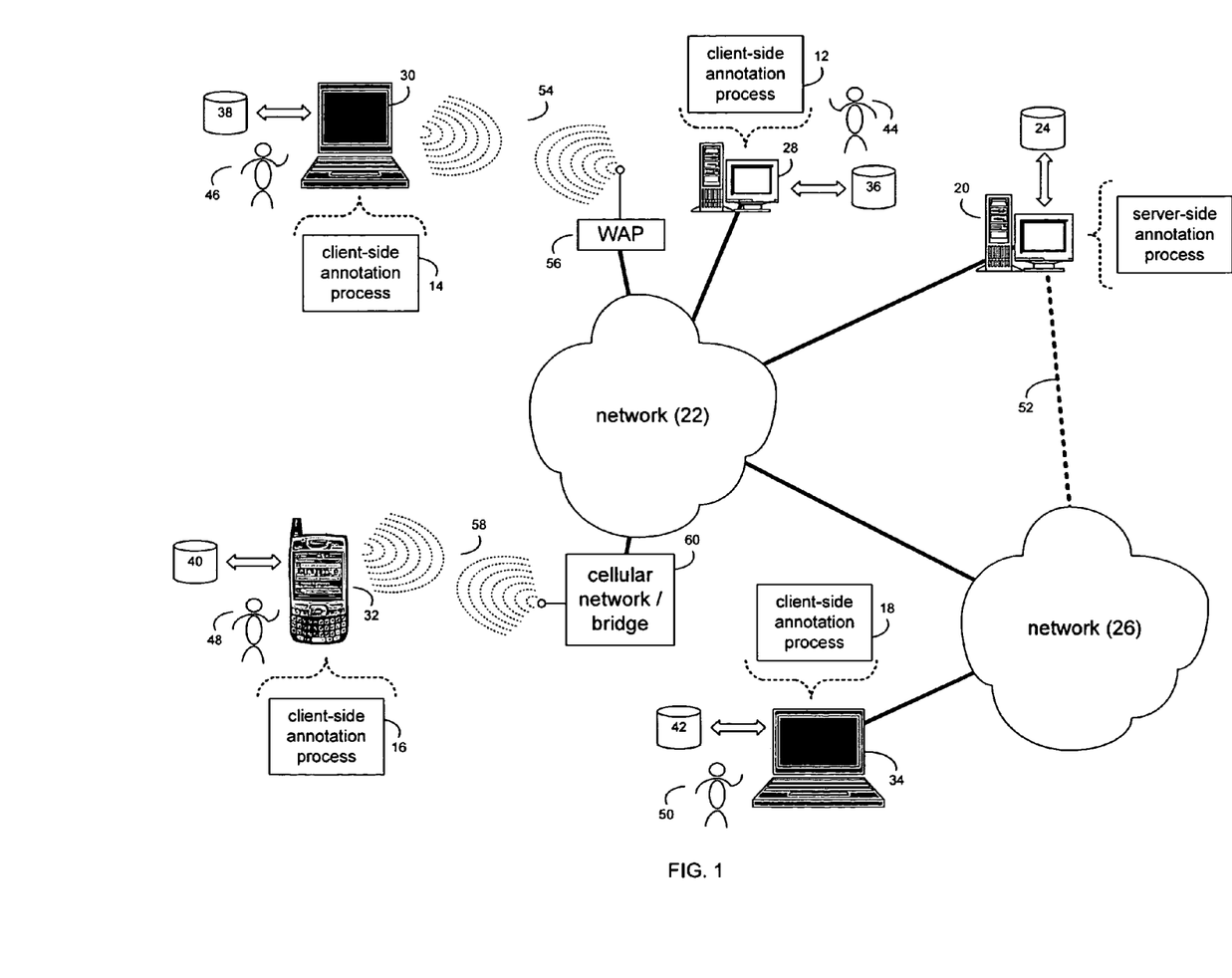
FIG. 1 is a diagrammatic view of an annotation process coupled to a distributed computing network.

System Overview:

Referring to FIG. 1, there is shown an annotation process. As will be discussed below, annotation process 10 may generate a data visualization based, at least in part, upon a data set. A user may be allowed to add an annotation to the data visualization and a determination may be made concerning whether the annotation is associatable with any portion of the data set.

The annotation process may be a server-side process (e.g., server-side annotation process 10), a client-side process (e.g., client-side annotation process 12, client-side annotation process 14, client-side annotation process 16, or client-side annotation process 18), or a hybrid server-side/client-side process (e.g., the combination of server-side annotation process 10 and one or more of client-side annotation processes 12, 14, 16, 18).

Server-side annotation process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and a mainframe computer. Server computer 20 may be a web server (or a series of servers) running a network operating system, examples of which may include but are not limited to: Microsoft Windows XP Server™; Novell Netware™; or Redhat Linux™, for example.

The instruction sets and subroutines of server-side annotation process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS™, Novell Webserver™, or Apache Webserver™, that allows for HTTP (i.e., HyperText Transfer Protocol) access to server computer 20 via network 22. Network 22 may be connected to one or more secondary networks (e.g., network 26), examples of which may include but are not limited to: a local area network; a wide area network; or an intranet, for example.

Client-side annotation processes 12, 14, 16, 18 may reside on and may be executed by client electronic devices 28, 30, 32, 34 (respectively), examples of which may include but are not limited to personal computer 28, laptop computer 30, personal digital assistant 32, notebook computer 34, a data-enabled, cellular telephone (not shown), and a dedicated network device (not shown), for example. Client electronic devices 28, 30, 32, 34 may each be coupled to network 22 and/or network 26 and may each execute an operating system, examples of which may include but are not limited to Microsoft Windows™, Microsoft Windows CE™, Redhat Linux™, or a custom operating system.

The instruction sets and subroutines of client-side annotation processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

If the annotation process is configured as a server-side annotation process, client-side annotation processes 12, 14, 16, 18 may be e.g., a web browsing application, such as Microsoft Internet Explorer™ and Netscape Navigator™ that allows for communication with server-side annotation process 10 via e.g., network 22 and/or network 26. Accordingly, server-side annotation process 10 may be a web-based process (that is accessed via network 22 and/or network 26 using a web browsing application) which allows a user to annotate a data visualization.

If the annotation process is configured as a client-side annotation process, client-side annotation processes 12, 14, 16, 18 may be stand-alone, client-side applications that allow a user to annotate a data visualization.

If the annotation process is configured as a hybrid server-side/client-side annotation process, the combination of server-side annotation process 10 and one or more of client-side annotation processes 12, 14, 16, 18 may allow a user to annotate a data visualization. Accordingly, client-side annotation processes 12, 14, 16, 18 may be client-side applications that interface with server-side annotation process 10 via network 22 and/or network 26.

Users 44, 46, 48, 50 may access server-side annotation process 10 directly through the device on which the client-side annotation process (e.g., client-side annotation processes 12, 14, 16, 18) is executed, namely client electronic devices 28, 30, 32, 34, for example. Users 44, 46, 48, 50 may access server-side annotation process 10 directly through network 22 and/or through secondary network 26. Further, server computer 20 (i.e., the computer that executes server-side annotation process 10) may be connected to network 26 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 22 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Personal digital assistant 32 is shown wirelessly coupled to network 22 via wireless communication channel 58 established between personal digital assistant 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Annotation Process:

For the following discussion, server-side annotation process 10 is going to be described for illustrative purposes, in which client-side annotation processes 12, 14, 16, 18 are web browsing applications that allow for communication with server-side annotation process 10. However, this is not intended to be a limitation of this disclosure, as other configurations are possible, examples of which include but are not limited to a stand-alone, client-side process or a hybrid server-side/client-side process.

Figure 2:
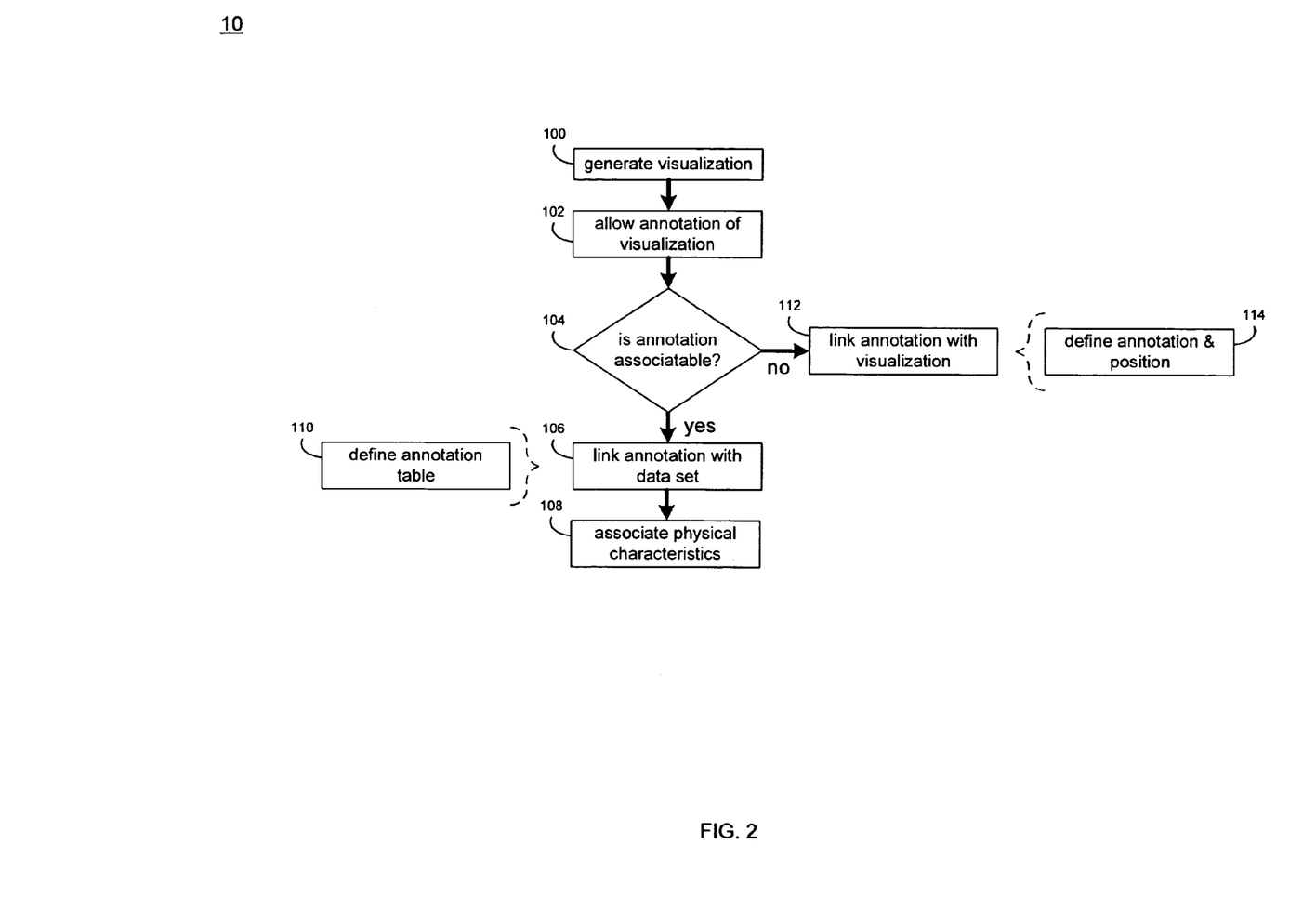
FIG. 2 is a flowchart of a process executed by the annotation process of FIG. 1.
Figure 3:
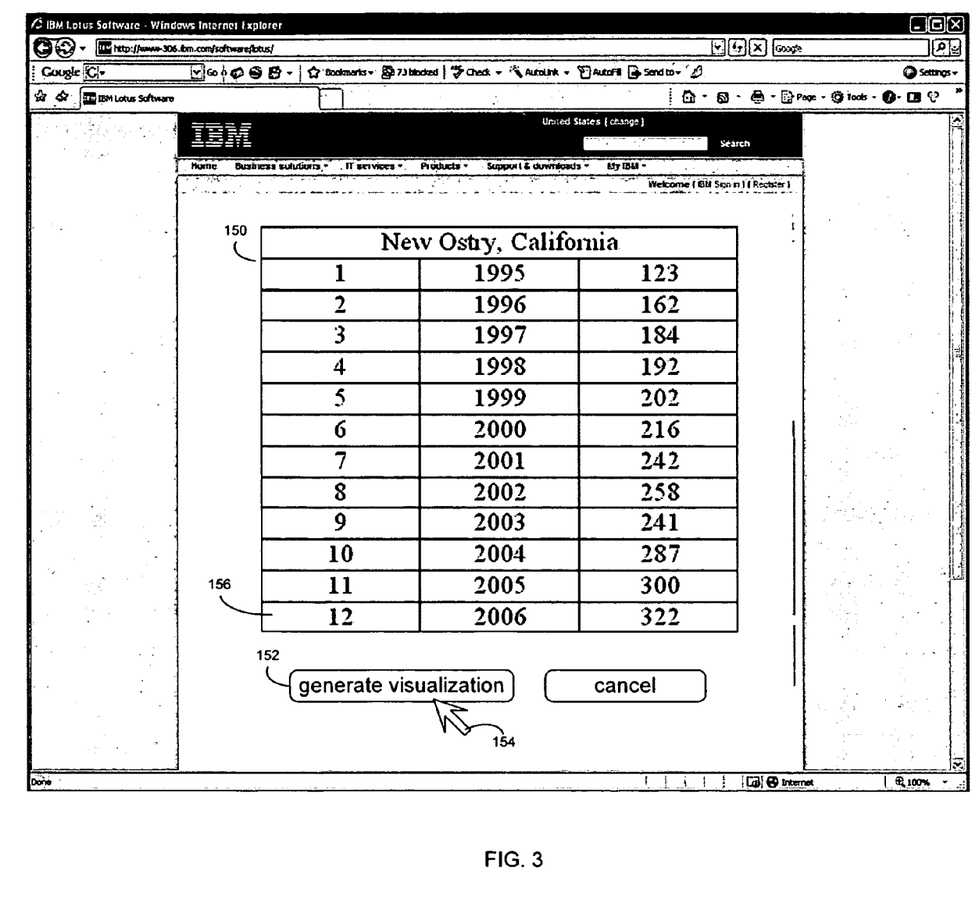
FIG. 3 is a diagrammatic representation of tabular data managed by the annotation process of FIG. 1.

Referring also to FIGS. 2 & 3, server-side annotation process 10 may allow a user (e.g., user 44) to generate 100 a data visualization based, at least in part, upon a data set. An example of such a data set may include but is not limited to tabular data set 150. In this particular example, tabular data set 150 defines the 1995-2006 homicide figures for the fictitious town of New Ostry, Calif. Once user 44 defines tabular data set 150, user 44 may select e.g., "generate visualization" button 152 using onscreen pointer 154, which may be controllable by a pointing device (e.g., a mouse; not shown).

Figure 4:
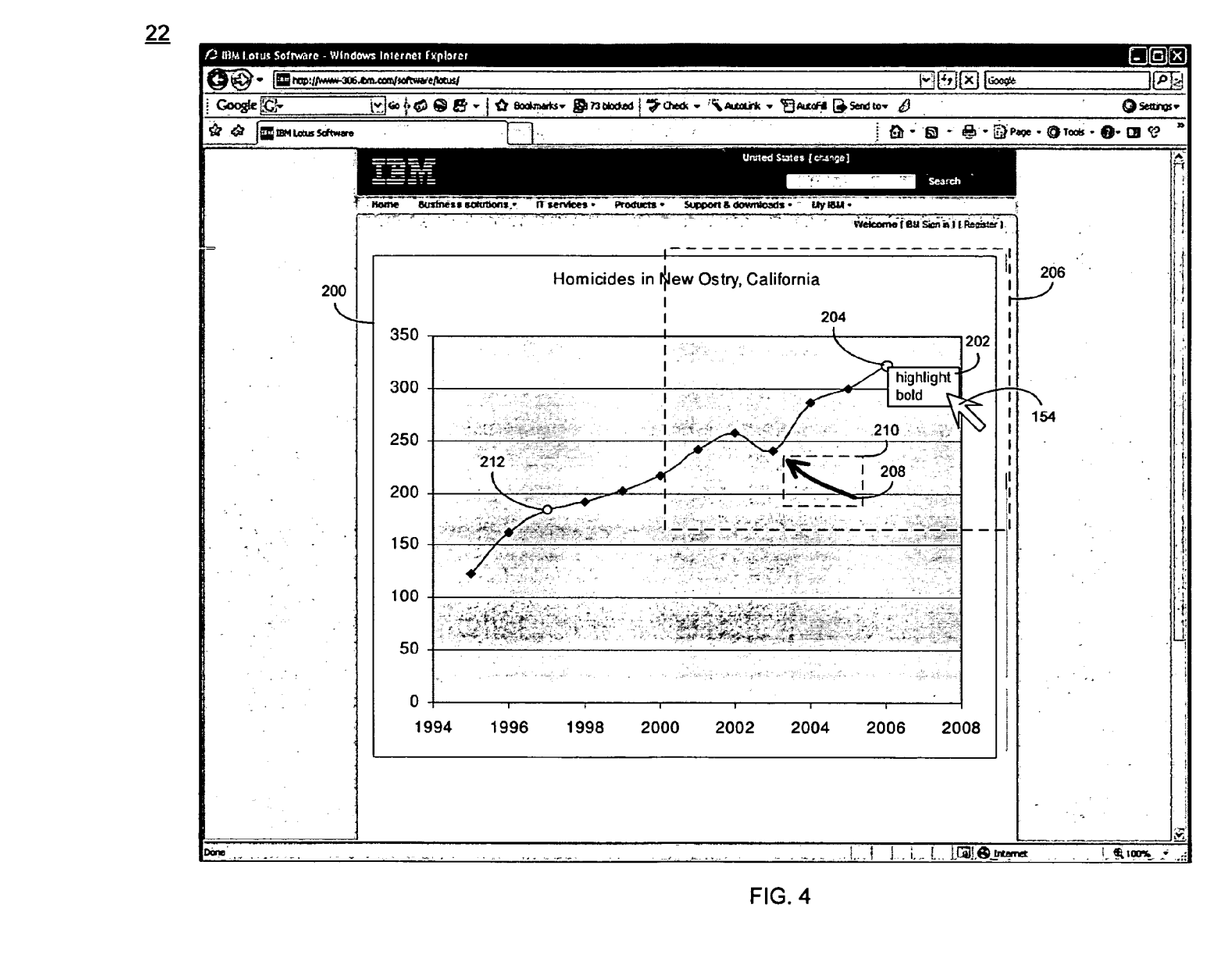
FIG. 4 is a diagrammatic view of a data visualization based upon the tabular data of FIG. 3 and rendered by the annotation process of FIG. 1.

Referring also to FIG. 4, once user 44 selects e.g., "generate visualization" button 152, server-side annotation process 10 may generate 100 data visualization 200 that may be a graphical representation of tabular data set 150. While in this particular example, data visualization 200 is shown to be a line graph, this is for illustrative purposes only and is not intended to be a limitation of this disclosure. For example, data visualization 200 may be a pie chart of data set 150, a bar chart of data set 150, or a three-dimensional model of data set 150.

Server-side annotation process 10 may allow 102 users (e.g., users 44, 46, 48, 50) to add annotations to data visualization 200. Examples of annotations may include but are not limited to the highlighting of one or more data points included within data visualization 200, the bolding of one of more data points included within data visualization 200, the insertion of text into data visualization 200, and the insertion of graphical annotations within data visualization 200.

An example of the manner in which a user may annotate data visualization 200 may include, but is not limited to, the use of popup menu 202. For example, user 44 may "right click" the pointing device controlling onscreen pointer 154, resulting in server-side annotation process 10 rendering popup menu 202. Popup menu 202 may include a plurality of annotation choices examples of which may include but are not limited to "highlight" and "bold". User 44 may then select e.g., "bold" using onscreen pointer 154, resulting in server-side annotation process 10 bolding visualization data point 204 included within data visualization 200, wherein visualization data point 204 is associated with data point 156 included within data set 150).

When a user adds an annotation to data visualization 200, server-side annotation process 10 may determine 104 whether the annotation being added is associatable with any portion of the data set. For example, server-side annotation process 10 may determine 104 whether the annotation being added may be tied to a particular point (or a particular set of data points) included within data set 150. If 104 the annotation is associatable with any portion of the data set, the annotation may be linked 106 with a specific portion of the data set. For example, if the user is bolding a specific data point within data set 150, the bolding operation may be associated with the data point being bolded. For example, if user 44 is annotating 102 data visualization 200 by bolding data point 156 (i.e., data point "Year 2006, Homicides 322"), being that the annotation is associatable 104 with data point 156, server-side annotation process 10 may link 106 the annotation (i.e., a bolding operation) with a specific data point (i.e., data point "Year 2006, Homicides 322") within data set 150. By linking 106 the annotation (i.e., the bolding operation) specifically with a portion of data set 150 (i.e., data point 156), in the event that the data visualization 200 is changed/transformed, the annotation of linked 106 data point 156 may be utilized in the changed/transformed version of data visualization 200. For example, if data visualization 200 is changed from a line chart (i.e., as shown in FIG. 4) to a bar chart, the portion of bar chart indicative of data point 156 may also be bolded. Accordingly, by linking 106 annotations with specific data points (e.g., data point 156) within a data set (e.g., data set 150), the data visualization (i.e., data visualization 200) may be transformed from a first configuration (e.g., a line chart) to a second configuration (e.g., a bar chart) while maintaining the annotation made by the various users annotating the data visualization.

If 104 the annotation being added to data visualization 200 is associatable with any portion of the data set (e.g., data point 156), a current state of one or more physical characteristics of data visualization 200 may be associated 108 with the annotation. For example, if user 44 zooms into data visualization 200 when bolding data point 156, the zoom level (e.g., 200%) and the area being "zoomed" into (as represented by "zoom" area 206) may be saved so that the next viewer of data visualization 200 may view data visualization 200 in the same manner that the annotator (i.e., user 44) of data visualization 200 had viewed data visualization 200.

If 104 the annotation being added to data visualization 200 is not associatable with any portion of the data set (e.g., a specific data point), the annotation may be linked 112 with the data visualization (as opposed to a specific visualization data point 204 included within data visualization 200). Linking 112 the annotation with data visualization 200 may include defining 114 the annotation and defining the position of the annotation within the data visualization. For example, assume that a second user (e.g., user 46) adds a non-associatable annotation (i.e., an annotation that is not associated with a specific data point within data set 150) to data visualization 200. An example of such a non-associatable annotation includes freehand arrow 208.

As discussed above, multiple users may be allowed to add annotations to data visualization 200. Accordingly, user 46 (e.g., Paul) may draw freehand arrow 208 using e.g., the pointing device (not shown) that controls onscreen pointer 154. Other examples of non-associatable annotations may include but are not limited to text-based annotations, underlines, and circles that encapsulate other objects within data visualization 200. When defining 114 the annotation and defining the position of the annotation within data visualization 200, server-side annotation process 10 may define the type of annotation (i.e., an upward pointing arrow) and may define the position of the annotation (e.g., within data visualization 200. For example, once user 44 draws freehand arrow 208, server-side annotation process 10 may save freehand arrow 208 as an image file 210 (e.g., a EPS image) and the position of this file may be defined with respect to data visualization 200. Accordingly, the position of the lower left hand corner of image file 210 (with respect to data visualization 200) may be defined by server-side annotation process 10 to be at e.g., pixel location X:420, Y:210.

The above-described manner in which server-side annotation process 10 defines the position of freehand arrow 208 is for illustrative purposes only and is not intended to be a limitation of this disclosure, as other configurations are possible and are considered to be within the scope of this disclosure. Accordingly, server-side annotation process 10 may simply store whatever information is required to recreate and position freehand arrow 208 within data visualization 200. Examples of such information may include but are not limited to various properties rating to position, shape, size and color.

When rendering data visualization 200, server-side annotation process 10 may render non-associatable annotations (e.g., freehand arrow 208) within a separate visualization layer (not shown). Accordingly, this visualization layer (not shown) may be positioned above data visualization 200 and may be a transparent overlay that allows for the positioning of the non-associatable annotations within data visualization 200, while allowing data visualization 200 be visible through and separate from the visualization layer (not shown).

Figure 5:
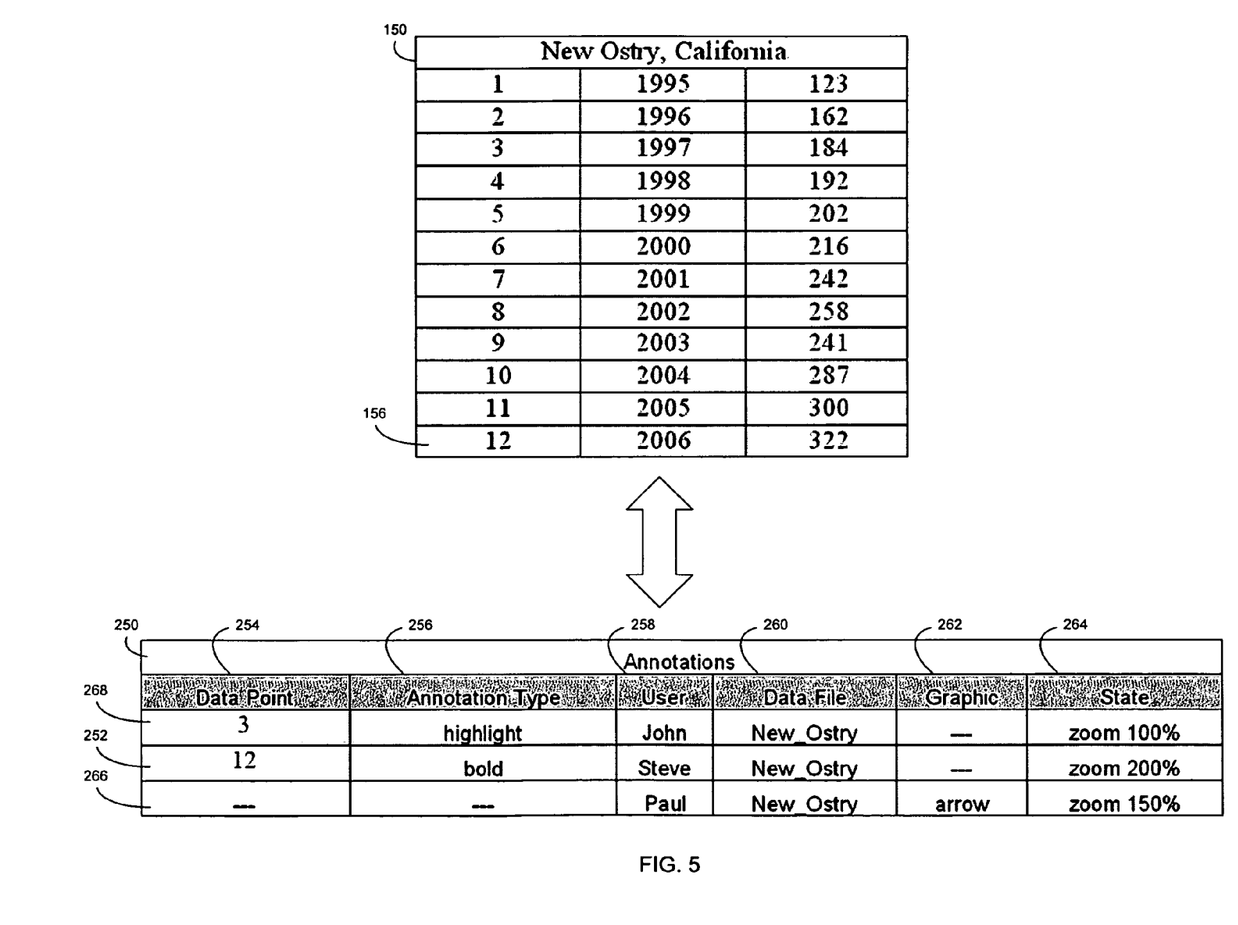
FIG. 5 is a diagrammatic view of tabular data and an annotation table managed by the annotation process of FIG. 1.

Referring also to FIG. 5, when server-side annotation process 10 links 106 the annotation with a specific portion of the data set, server-side annotation process 10 may define 110 an annotation table 250 that may identify the linkage between the annotation added and the specific portion of the data set. For example, assume that the user ID of user 44 is "Steve" and, as discussed above, user 44 annotated 102 data visualization 200 by bolding data point 156 included within data set 150. Accordingly, line item 252 within annotation table 250 may define the linkage between data point "12" (i.e., data point 156 within data set 150) and the annotation added by user 44. Annotation table 252 may include e.g., "Data Point" column 254; "Annotation Type" column 256; "User" column 258; "Data File" column 260; "Graphic" column 262; and "State Column" 264.

"Data Point" column 254 within annotation table 250 may define the specific data point being annotated. The entries within "Data Point" column 254 may be sufficiently descriptive to allow for a line item within annotation table 250 to be associated with a data point within data set 150. As discussed above, non-associatable annotation are not associated with a specific data point within data set 150. Accordingly, for line items that define a non-associatable annotation (e.g., line item 266), "Data Point" column 254 may be left blank, as the annotation is not associated with a specific data point defined within data set 150.

"Annotation Type" column 256 within annotation table 250 may define the type of annotation being applied to the specific data point being annotated. The entries within "Annotation Type" column 256 may define one of a plurality of predefined annotation types. As discussed above and for illustrative purposes, popup menu 202 was shown to include a plurality of annotation choices examples of which may include but are not limited to "highlight" and "bold". Accordingly and continuing with the above-stated example, "Annotation Type" column 256 may define the annotation type as either "highlight" or "bold". As discussed above, non-associatable annotation are not associated with a specific data point within data set 150. Accordingly, for line items that define a non-associatable annotation (e.g., line item 266), "Annotation Type" column 256 may be left blank, as the annotation is not associated with a specific data point defined within data set 150.

"User" column 258 within annotation table 250 may define the user who made a specific annotation to data visualization 200. For example, line item 252 may identify "Steve" (i.e., user 44) as the user who "bolded" visualization data point 204 (included within data visualization 200). Additionally, line item 266 may identify "Paul" (i.e., user 46) as the user who annotated data visualization 200 by adding freehand arrow 208. Further, line item 268 within annotation table 150 may identify "John" (i.e., user 48) as the user who "highlighted" visualization data point 212 (included within data visualization 200).

"Data File" column 260 within annotation table 250 may define the data file to which an annotation was added. For example, if annotation table 150 is designed to keep track of annotations added to multiple data files, "Data File" column 260 may be populated with a plurality of different filenames (and a plurality of different data paths) that identify the data file to which the annotation was added. In the event that annotation table 150 is only defining the annotations added to a single data file, "Data File" column 260 may only be populated with a single filename (and a single data path).

"Graphic" column 262 within annotation table 250 may define the non-associatable annotation to be added to data visualization 200. As discussed above, annotations may be associated with a data point included within e.g., data set 150. In the event that a line item within annotation table 150 concerns an annotation associated with a specific data point (as opposed to a non-associatable annotation), "Graphic" column 262 may be blank for those line items (e.g., as in line items 252, 268). For line items concerning non-associated annotations (e.g., line item 266), "Graphic" column 262 may e.g., describe the non-associatable annotation (e.g., arrow); and/or define a filename (and path) for the non-associatable annotation.

"State Column" 264 within annotation table 250 may define the current state of one or more physical characteristics of data visualization 200 at the time that the user added the annotation to data visualization 200. For example, if user 44 zooms into data visualization 200 when bolding data point 156, the zoom level (e.g., 200%) and the area being "zoomed" into (as represented by "zoom" area 206) may be saved so that the next viewer of data visualization 200 may view data visualization 200 in the same manner that the annotator (i.e., user 44) of data visualization 200 had viewed data visualization 200.

A number of implementations have been described. Nevertheless, it will be understood that various modifications may be made. Accordingly, other implementations are within the scope of the following claims.

What is claimed is:

1. A method comprising:
   generating, via a computing device, a data visualization based, at least in part, upon a data set;
   allowing, via the computing device, a first user to add, via a graphical user interface associated with the data visualization, an annotation to at least a portion of the data visualization;
   determining, via the computing device, if the annotation added by the first user via the graphical user interface associated with the data visualization is associatable with any portion of the data set, based upon, at least in part, a user selection of the portion of the data set when the annotation is added;
   if the annotation added by the first user via the graphical user interface associated with the data visualization is associatable with any portion of the data set, defining, via the computing device, an annotation table that identifies a linkage between the annotation added by the first user via the graphical user interface associated with the data visualization and the specific portion of the data set, the specific portion of the data set including at least one data point of the data set;
   changing, via the computing device, the data visualization from a first graphical representation based upon, at least in part, the data set to a second graphical representation based upon, at least in part, the data set, wherein the first graphical representation includes at least one of a chart, a graph, and a model, wherein the second graphical representation includes a different chart, graph, or model from the first graphical representation; and
   maintaining, via the computing device, the annotation added by the first user via the graphical user interface associated with the data visualization in the second graphical representation by utilizing the linkage between the annotation added by the first user via the graphical user interface associated with the data visualization and the specific portion of the data set.

2. The method of claim 1 further comprising:
   if the annotation added by the first user via the graphical user interface associated with the data visualization is associatable with any portion of the data set, associating a current state of one or more physical characteristics of the data visualization with the annotation added by the first user via the graphical user interface associated with the data visualization.

3. The method of claim 2, wherein one of the one or more physical characteristics is a zoom level associated with the data visualization when the annotation was added by the first user via the graphical user interface associated with the data visualization.

4. The method of claim 1 further comprising:
   if the annotation added by the first user via the graphical user interface associated with the data visualization is not associatable with any portion of the data set, linking the annotation added by the first user via the graphical user interface associated with the data visualization with the data visualization.

5. The method of claim 4 wherein linking the annotation with the data visualization includes:

defining the annotation added by the first user via the graphical user interface associated with the data visualization; and defining the position of the annotation, added by the first user via the graphical user interface associated with the data visualization, within the data visualization.

6. The method of claim 1 wherein the data set is a tabular data set.

7. The method of claim 1 wherein the data visualization is a graphical representation of the data set.

8. The method of claim 1 further comprising:
allowing a second user to add an annotation to at least a portion of the data visualization.

9. The method of claim 1 further comprising:
defining, in the annotation table, at least one data file to which the annotation was added.

10. A computer program product residing on a computer readable medium having a plurality of instructions stored thereon which, when executed by a processor, cause the processor to perform operations comprising:
generating a data visualization based, at least in part, upon a data set;
allowing a first user to add, via a graphical user interface associated with the data visualization, an annotation to at least a portion of the data visualization;
determining if the annotation added by the first user via the graphical user interface associated with the data visualization is associatable with any portion of the data set, based upon, at least in part, a user selection of the portion of the data set when the annotation is added;
if the annotation added by the first user via the graphical user interface associated with the data visualization is associatable with any portion of the data set, defining an annotation table that identifies a linkage between the annotation added by the first user via the graphical user interface associated with the data visualization and the specific portion of the data set, the specific portion of the data set including at least one data point of the data set;
changing the data visualization from a first graphical representation based upon, at least in part, the data set to a second graphical representation based upon, at least in part, the data set, wherein the first graphical representation includes at least one of a chart, a graph, and a model, wherein the second graphical representation includes a different chart, graph, or model from the first graphical representation; and
maintaining the annotation added by the first user via the graphical user interface associated with the data visualization in the second graphical representation by utilizing the linkage between the annotation added by the first user via the graphical user interface associated with the data visualization and the specific portion of the data set.

11. The computer program product of claim 10 further comprising instructions for:
if the annotation added by the first user via the graphical user interface associated with the data visualization is associatable with any portion of the data set, associating a current state of one or more physical characteristics of the data visualization with the annotation added by the first user via the graphical user interface associated with the data visualization.

12. The computer program product of claim 11, wherein one of the one or more physical characteristics is a zoom level associated with the data visualization when the annotation was added by the first user via the graphical user interface associated with the data visualization.

13. The computer program product of claim 10 further comprising instructions for:
if the annotation added by the first user via the graphical user interface associated with the data visualization is not associatable with any portion of the data set, linking the annotation added by the first user via the graphical user interface associated with the data visualization with the data visualization.

14. The computer program product of claim 13 wherein the instructions for linking the annotation with the data visualization include instructions for:
defining the annotation added by the first user via the graphical user interface associated with the data visualization; and
defining the position of the annotation added by the first user via the graphical user interface associated with the data visualization within the data visualization.

15. The computer program product of claim 10 wherein the data set is a tabular data set.

16. The computer program product of claim 10 wherein the data visualization is a graphical representation of the data set.

17. The computer program product of claim 10 further comprising instructions for:
allowing a second user to add an annotation to at least a portion of the data visualization.

18. The computer program product of claim 10 further comprising instructions for:
defining, in the annotation table, at least one data file to which the annotation was added.

* * * * *